United States Patent
Yamada

(10) Patent No.: US 9,781,328 B2
(45) Date of Patent: Oct. 3, 2017

(54) IMAGE PICKUP ELEMENT FOR DETECTING SATURATION AND OUTPUTTING THE RESULT OF SATURATION DETECTION IN ASSOCIATION WITH PIXEL SIGNAL, METHOD FOR CONTROLLING IMAGE PICKUP ELEMENT, AND IMAGE PICKUP APPARATUS

(71) Applicant: CANON KABUSHIKI KAISHA, Tokyo (JP)

(72) Inventor: Satoshi Yamada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/790,711

(22) Filed: Jul. 2, 2015

(65) Prior Publication Data

US 2016/0006925 A1  Jan. 7, 2016

(30) Foreign Application Priority Data

Jul. 7, 2014  (JP) ................................ 2014-139806
Jun. 3, 2015  (JP) ................................ 2015-113307

(51) Int. Cl.
*H04N 5/232* (2006.01)
*H04N 5/369* (2011.01)
(Continued)

(52) U.S. Cl.
CPC ......... *H04N 5/23212* (2013.01); *H04N 5/359* (2013.01); *H04N 5/3696* (2013.01); *H04N 9/045* (2013.01)

(58) Field of Classification Search
None
See application file for complete search history.

(56) References Cited

U.S. PATENT DOCUMENTS

2011/0085062 A1  4/2011 Rhodes
2013/0087875 A1*  4/2013 Kobayashi .......... H01L 27/1461
                                                                 257/432

(Continued)

FOREIGN PATENT DOCUMENTS

JP  2008-134389 A  6/2008
JP  2013-084742 A  5/2013

OTHER PUBLICATIONS

The above patent documents were cited in a European Search Report issued on Feb. 15, 2016, that issued in the corresponding European Patent Application No. 15174745.8.

*Primary Examiner* — Shahbaz Nazrul
(74) *Attorney, Agent, or Firm* — Cowan, Liebowitz & Latman, P.C.

(57) ABSTRACT

An image pickup element including an image pickup unit including an array of a plurality of unit pixels, each of the plurality of unit pixels including a plurality of pixels; a saturation detection unit configured to detect a saturated pixel based on a plurality of pixel signals of a subject image output from the plurality of pixels of each of the plurality of unit pixels; a first image signal generation unit configured to generate a first image signal of the subject image by combining the plurality of pixel signals output from each of ones of the plurality of pixels; and an output unit configured to output information indicating a result of detection of the saturated pixel conducted by the saturation detection unit and the first image signal.

16 Claims, 11 Drawing Sheets

(51) Int. Cl.
*H04N 9/04* (2006.01)
*H04N 5/359* (2011.01)

(56) References Cited

U.S. PATENT DOCUMENTS

| | | | |
|---|---|---|---|
| 2013/0235276 A1 | 9/2013 | Ogawa | |
| 2013/0286275 A1* | 10/2013 | Ogawa | H04N 5/23212 348/345 |
| 2013/0293763 A1 | 11/2013 | Shoda et al. | |
| 2014/0016006 A1 | 1/2014 | Tashiro et al. | |
| 2014/0043523 A1* | 2/2014 | Yamazaki | H04N 5/3696 348/352 |
| 2014/0118610 A1* | 5/2014 | Ohara | H04N 5/23212 348/349 |
| 2014/0139716 A1* | 5/2014 | Sasaki | H01L 27/14627 348/311 |
| 2014/0146196 A1 | 5/2014 | Shoda et al. | |
| 2014/0146218 A1* | 5/2014 | Kunieda | H04N 5/23212 348/345 |
| 2014/0285707 A1* | 9/2014 | Ogawa | H04N 5/3572 348/353 |
| 2014/0307134 A1* | 10/2014 | Kanda | H04N 5/23212 348/280 |
| 2016/0309102 A1* | 10/2016 | Koizumi | H04N 9/045 |

\* cited by examiner

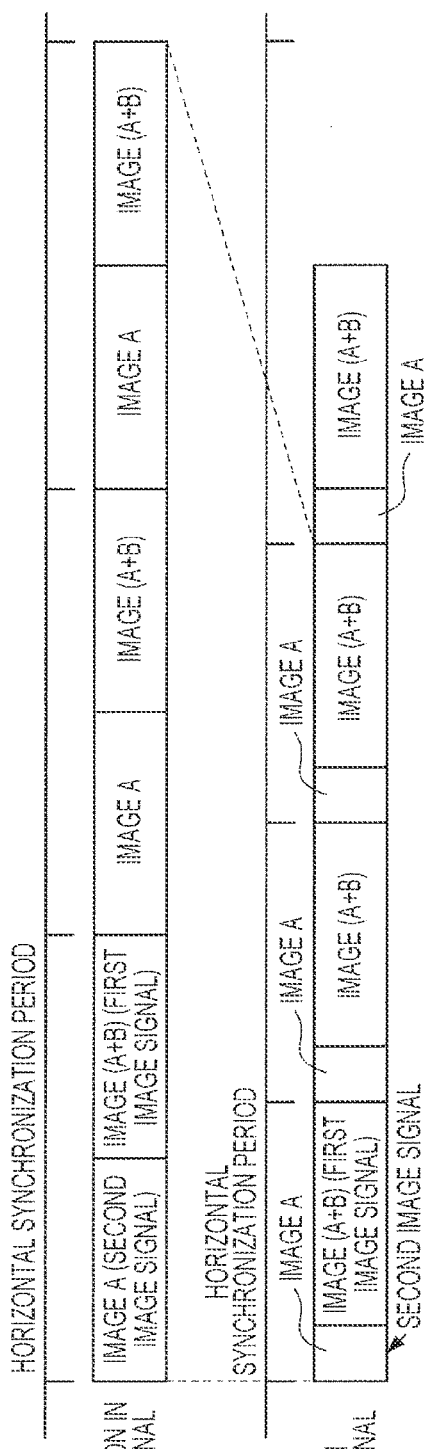

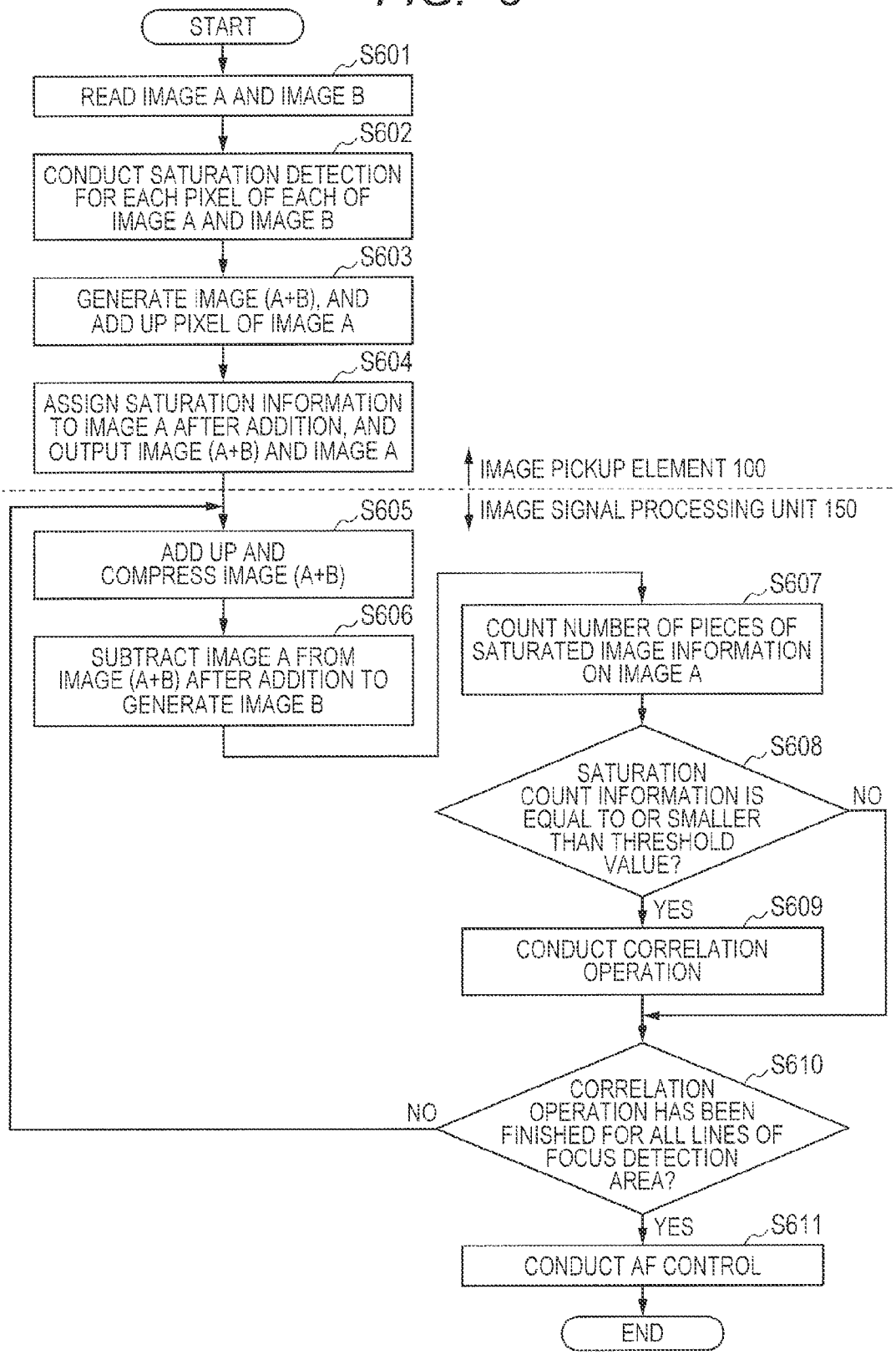

IMAGE PICKUP ELEMENT FOR DETECTING SATURATION AND OUTPUTTING THE RESULT OF SATURATION DETECTION IN ASSOCIATION WITH PIXEL SIGNAL, METHOD FOR CONTROLLING IMAGE PICKUP ELEMENT, AND IMAGE PICKUP APPARATUS

BACKGROUND OF THE INVENTION

Field of the Invention

The present invention relates to an image pickup element, a method for controlling an image pickup element, and an image pickup apparatus.

Description of the Related Art

There is known a phase difference detection method (deviation method) as a method for detecting a focus state of a photographing lens. In the phase difference detection method, a light flux that has passed through an exit pupil of the photographing lens is divided into two, and light fluxes divided into two are respectively received by a pair of sensors for focus detection. Then, based on light receiving amounts thereof, a deviation amount between a pair of image signals output from the pair of sensors for focus detection, namely, a relative positional displacement amount between a pair of images in a direction in which the light flux is divided is detected, to thereby directly obtain a drive amount of the photographing lens necessary to achieve an in-focus state. Therefore, a defocus amount and a direction thereof are obtained by conducting an accumulation operation one time with the sensors for focus detection, which enables a high-speed focus adjustment operation.

In Japanese Patent Application Laid-Open No. 2008-134389, there is disclosed a technology for realizing a high-speed phase difference AF while eliminating the need for a dedicated sensor for focus detection by providing an image pickup element with a phase difference detection function.

In Japanese Patent Application Laid-Open No. 2013-084742, a problem is focused on, where an area of a pixel is divided into a plurality of photoelectric converters to cause reduction in capacity that can accumulate photoelectric conversion signals per photoelectric converter, that is, to cause reduction in amount of photoelectric conversion charges that can be accumulated until saturation. After one of the divided photoelectric converters has been saturated, even when outputs of the photoelectric converters corresponding to the same microlens are added up, an output of the addition fails to exhibit a linear characteristic due to an influence of the saturation, and hence image quality deteriorates.

Therefore, in Japanese Patent Application Laid-Open No. 2013-084742, there is disclosed a technology for forming a pixel so that a signal charge of the photoelectric converter that has been saturated leaks into another photoelectric converter corresponding to the same microlens. With such a pixel structure, in Japanese Patent Application Laid-Open No. 2013-084742, linearity is improved, which is exhibited when the pixels corresponding to the same microlens are added up without losing a charge photoelectrically converted by the photoelectric converter that has been saturated.

However, according to the related art, a focus sometimes cannot be detected satisfactorily.

SUMMARY OF THE INVENTION

An object of the present invention is to provide an image pickup element, a method for controlling the image pickup element, and an image pickup apparatus, which are capable of detecting a focus satisfactorily.

According to one aspect of an embodiment, an image pickup element, including an image pickup unit including an array of a plurality of unit pixels, each of the plurality of unit pixels including a plurality of pixels; a saturation detection unit configured to detect a saturated pixel based on a plurality of pixel signals of a subject image output from the plurality of pixels of each of the plurality of unit pixels; a first image signal generation unit configured to generate a first image signal of the subject image by combining the plurality of pixel signals output from each of ones of the plurality of pixels; and an output unit configured to output information indicating a result of detection of the saturated pixel conducted by the saturation detection unit and the first image signal.

Further features of the present invention will become apparent from the following description of exemplary embodiments with reference to the attached drawings.

BRIEF DESCRIPTION OF THE DRAWINGS

FIG. 4A, FIG. 4B, FIG. 4C, and FIG. 4D are diagrams for illustrating a timing chart of an image signal output from the image pickup element illustrated in FIG. 2A to FIG. 2B.

FIG. 6 is a diagram for illustrating a flowchart of a focus adjustment operation for an image pickup signal to which the focus adjustment apparatus according to the first embodiment of the present invention is applied.

DESCRIPTION OF THE EMBODIMENTS

In regard to a pixel of an image pickup element, a consideration is given to an image pickup apparatus including an image pickup unit in which one pixel is formed of a plurality of photodiodes (photoelectric converters) as disclosed in the above-mentioned Japanese Patent Application Laid-Open No. 2008-134389. In this case, in order to conduct focus adjustment, it is necessary to acquire signals from two photodiodes separately from each other, and to acquire a pixel-basis image pickup signal that combines the signals obtained from the two photodiodes for the purpose of recording and display. This raises a problem in that an amount of signals read by the image pickup unit increases and that a read time thereof increases, which inhibits an increase in acquisition rate (frame rate) for an image to be picked up.

Further, in the above-mentioned Japanese Patent Application Laid-Open No. 2013-084742, image quality is improved by improving an allowable saturation level of the finally obtained image, but a saturation level of a pupil divided image before the addition is not improved, which even causes an image collapse due to an influence of a pixel that has absorbed a charge leaked out of a saturated pixel. As a result, a correlation between images used when the phase difference is obtained deteriorates. In other words, an adverse effect is exerted on focus detection to cause deterioration of a focus detection accuracy or disable the focus detection. Thus, the focus detection is disabled even when a satisfactory image is obtained, and a distinction cannot be made between a time when the focus detection is enabled and a time when the focus detection is disabled, which may confuse a user.

Now, an exemplary embodiment of the present invention is described in detail with reference to the accompanying drawings.

First Embodiment

A first embodiment of the present invention is described with reference to FIG. 1 to FIG. 5B.

Figure 1:
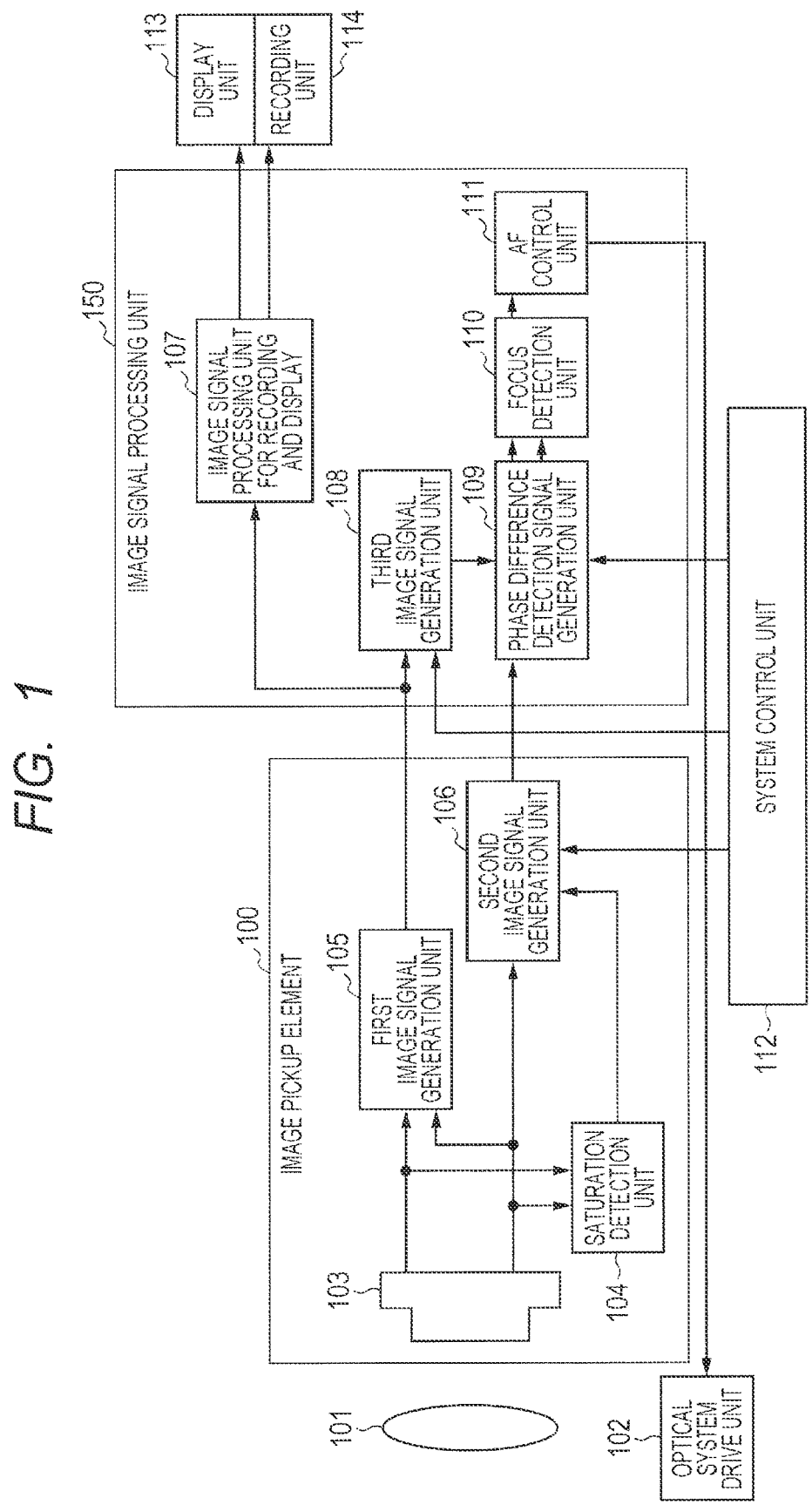
FIG. 1 is a system configuration diagram of an image pickup apparatus to which a focus adjustment apparatus according to a first embodiment of the present invention is applied.

First, a system configuration of an image pickup apparatus to which a focus adjustment apparatus according to this embodiment is applied is described with reference to FIG. 1. FIG. 1 is a system configuration diagram of a main part of the image pickup apparatus to which the focus adjustment apparatus according to this embodiment is applied, and a configuration that is not directly relevant to the present invention is omitted.

As illustrated in FIG. 1, the image pickup apparatus according to this embodiment includes an image pickup element 100 and an image signal processing unit 150. A photographing optical system 101 arranged in the previous stage of the image pickup element 100 is formed of a zoom lens, a diaphragm, a focus lens, a shift lens, and the like. Further, an optical system drive unit 102 controls the photographing optical system 101 based on focus information output from an AF control unit 111 described later and optical system drive information of a system control unit 112 described later. A part or an entirety of the photographing optical system 101 and the optical system drive unit 102 may be constructed to be detachably attachable. An image pickup unit 103 includes a plurality of unit pixels 200 each including a plurality of pixels 204 and 205 configured to receive a plurality of light fluxes each passing through divided areas of an exit pupil.

Further, a saturation detection unit 104 detects a saturated pixel based on a plurality of pupil-divided pixel signals output from the image pickup unit 103, and outputs a result thereof to a second image signal generation unit 106 described later. Specifically, the saturation detection unit 104 detects that a pixel corresponding to a pixel signal is the saturated pixel when the pixel signal has a signal level higher than a predetermined signal level. A configuration of the pixel signal used to detect the saturated pixel may be a configuration of a signal obtained from the image pickup unit 103 (for example, RGB signal), or may be a luminance signal, a brightness signal, or the like that are obtained therefrom. Further, instead of detecting the saturation with a binary value indicating whether or not the pixel is saturated, a degree of saturation may be detected in a multi-step manner. A first image signal generation unit 105 generates a first image signal for display and recording by combining the plurality of pupil-divided pixel signals output from the image pickup unit 103. The second image signal generation unit 106 generates a second image signal for focus detection by compressing a plurality of pupil-divided pixel signals output from the image pickup unit 103 based on image compression information supplied from the system control unit 112. Further, saturated pixel information is added to the second image signal based on a detection result from the saturation detection unit 104.

As described above, an image signal for display and recording and an image signal for phase difference detection are output from the image pickup element 100 including the image pickup unit 103, the saturation detection unit 104, the first image signal generation unit 105, and the second image signal generation unit 106.

In the image signal processing unit 150, an image signal processing unit 107 for recording and display conducts image processing for the image signals for display and recording generated by the first image signal generation unit 105 through the combining, and generates an image signal for display and recording, to send the image signal for display and recording to a display unit 113 and a recording unit 114. A third image signal generation unit 108 generates a third image signal by compressing the image signal from the image signal for display and recording generated by the first image signal generation unit 105 based on the image compression information input from the system control unit 112. In that case, the compression of the image signal is conducted so that the third image signal corresponds to the second image signal for focus detection sent from the second image signal generation unit 106 and the pupil-divided pixel of the image pickup element 100.

Further, a phase difference detection signal generation unit 109 receives the third image signal sent from the third image signal generation unit 108 and the second image signal for focus detection sent from the second image signal generation unit 106. The phase difference detection signal generation unit 109 generates signals for phase difference detection necessary for the focus detection by generating the pupil-divided image signal from those received signals. At this time, saturation count information obtained by counting the saturated pixel information assigned to the second image signal is generated together.

A focus detection unit 110 calculates phase difference information by a correlation operation conducted for a pair of signals for phase difference detection generated by the phase difference detection signal generation unit 109.

Further, the AF control unit 111 calculates the focus information for controlling a focus position of the photographing optical system 101 based on the calculated phase difference information. The system control unit 112 is configured to control the entire image pickup apparatus, and determines an image compression method by obtaining a position and size in which the focus detection is to be conducted based on the user's instruction or photographing information obtained from photographing scene detection, subject detection, or the like. The determined image compression method is sent to the second image signal generation unit 106 and the third image signal generation unit 108 as the image compression information.

The system configuration of the image pickup apparatus to which the focus adjustment apparatus according to this embodiment is applied has been described above.

Next, a configuration of the image pickup unit 103 within the image pickup apparatus according to this embodiment is described with reference to FIG. 2A to FIG. 2D. The image pickup unit 103 is an image pickup element using a scanning method of an X-Y address type, for example, a CMOS image sensor.

Figure 2A:
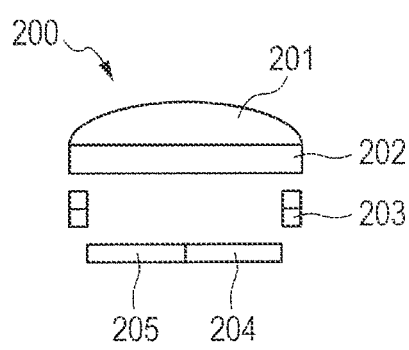
FIG. 2A, FIG. 2B, FIG. 2C, and FIG. 2D are configuration diagrams of an image pickup element included in the image pickup apparatus illustrated in FIG. 1.

FIG. 2A is an illustration of one of a plurality of unit pixels (pixel units) 200 that construct a pixel array formed on an image pickup surface of the image pickup unit 103. A microlens 201 is also arranged so as to correspond to each unit pixel, and is used to construct a microlens array.

FIG. 2A is an illustration of the microlens 201 for condensing light into the pixel and a color filter 202, which is generally arrayed so that colors such as RGB are repeated at fixed intervals. FIG. 2A is also an illustration of a wiring layer 203 and pixels 204 and 205, namely, photodiodes configured to conduct photoelectric conversion.

Figure 2B:
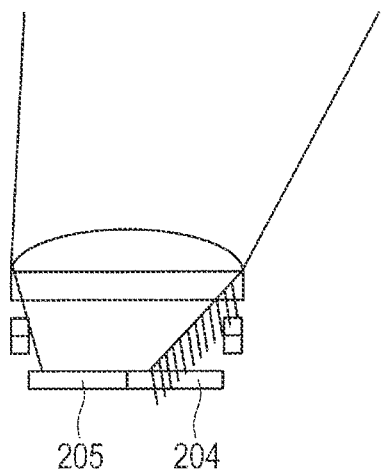
Figure 2C:
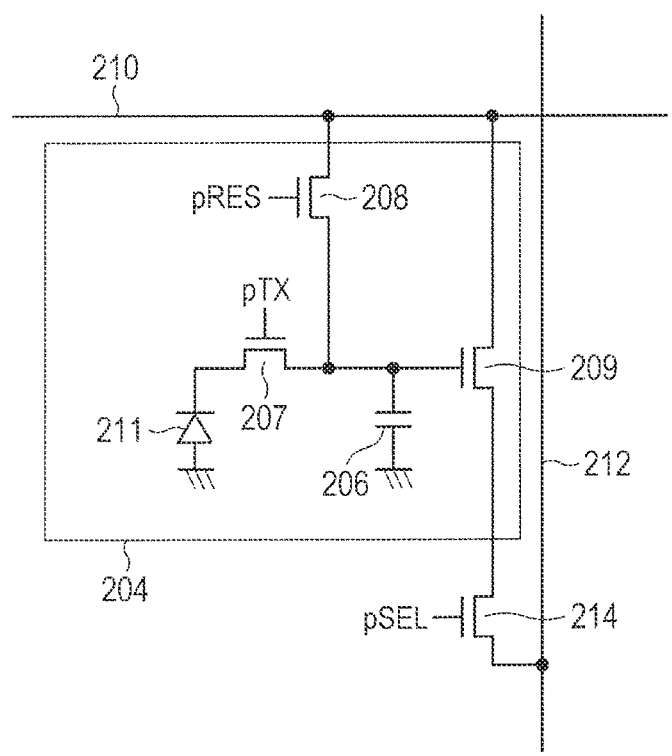
Figure 2D:
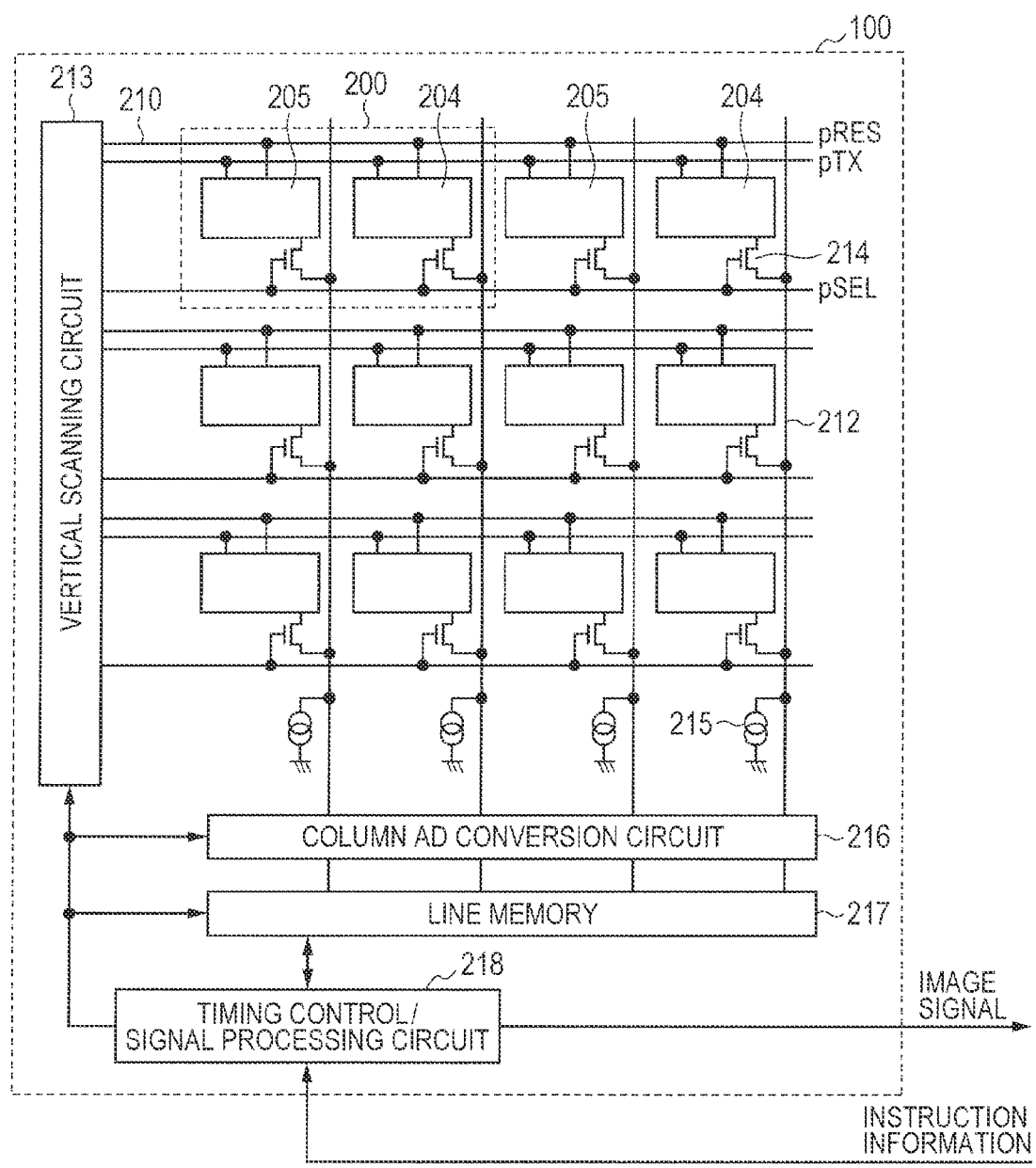

FIG. 2D is an overall configuration diagram of the image pickup unit 103 including the pixel unit 200. For the sake of brevity in description, in FIG. 2D, a configuration is illustrated in which as many pixel units 200 as (3 rows)×(4 columns) are arrayed, but in actuality, hundreds of thousands to tens of millions of pixel units 200 are arrayed in normal cases. Further, in the actual image pickup unit 103, the pixel units 200 are arranged in a two-dimensional shape with a predetermined aspect ratio. Further, the pixel units 200 each may be covered with a color filter for any one hue of R, G, and B, and may be arranged such that, for example, color filters for R, G, and B are arranged in a Bayer array.

Now, an operation of each block within the image pickup unit 103 is described with reference to FIG. 2A, FIG. 2C, and FIG. 2D. A floating diffusion unit (FD) 206 serves as an accumulation area for temporarily accumulating the charge generated in the photoelectric converter (photodiode) 211. A transfer switch 207 transfers the charge generated in the photoelectric converter 211 to the FD 206 by a transfer pulse pTX. A reset switch 208 uses a reset pulse pRES to remove the charge accumulated in the FD 206. An amplifying MOS transistor 209 functions as a source follower amplifier.

Gate electrodes of the transfer switch 207, the reset switch 208, and a selection switch 214 are connected to signal lines for supplying pTX, pRES, and pSEL, respectively, on a row-by-row basis, and are selectively scanned by a vertical scanning circuit 213. Further, the reset switch 208 and the amplifying MOS transistor 209 are connected to a power supply line 210. A constant current source 215 is a load on the amplifying MOS transistor 209. The pixel unit 200 and the constant current source 215 are connected to a column AD conversion circuit 216 via a signal output line 212 on a column-by-column basis. The FD 206, the amplifying MOS transistor 209, and the constant current source 215 form a floating diffusion amplifier. A signal charge of the pixel selected by the selection switch 214 is converted into a voltage, to be output to the column AD conversion circuit 216 via the signal output line 212.

The column AD conversion circuit 216 is a circuit configured to convert a voltage signal output from the pixel unit 200 into a digital code. In general, the column AD conversion circuit 216 is configured to compare the voltage signal with a ramp waveform by a comparator and start a counter when the ramp waveform starts to be output, to thereby convert a counter value obtained when the voltage signal coincides with the ramp waveform into the digital code.

The line memory 217 stores, as a digital signal, an output from the pixel unit 200 converted into the digital code by the column AD conversion circuit 216. A timing control/signal processing circuit 218 includes the saturation detection unit 104, the first image signal generation unit 105, and the second image signal generation unit 106 that are illustrated in FIG. 1. Based on instruction information received from the system control unit 112, the timing control/signal processing circuit 218 processes the digital signal stored in the line memory 217, and outputs the digital signal as the image signal. Further, the timing control/signal processing circuit 218 reads the digital signals (image signals) from the two pixels 204 and 205, which are adjacent to each other as illustrated in FIG. 2A, through the line memory 217 at the same time. Further, the timing control/signal processing circuit 218 is also configured to output the digital signals read from the pixels 204 and 205 after the digital signals are subjected to the addition by the first image signal generation unit 105 and the second image signal generation unit 106 within the image pickup element 100.

In a normal image pickup element, the pixel 204 and the pixel 205 are not separately provided, while in a pixel structure on which the present invention is premised, a pupil-divided image is obtained by the microlens 201 serving as a pupil division unit and the divided pixel 204 and the divided pixel 205 that are correspond to the microlens 201. A pupil is divided between an image (hereinafter referred to as "image A") formed of only the pixels 204 and an image (hereinafter referred to as "image B") formed of only the pixels 205, thereby causing a parallax. The parallax can be used for the purpose of focus detection, obtaining of a stereo image, or the like.

Further, when the pixel values of the pixel 205 and the pixel 204 are added up by the first image signal generation unit 105, the same pupil shape as a general pixel is regained, and hence the same image as that of a general image pickup element can be obtained by subjecting the added pixels to general signal processing. In the following description, a first image signal obtained by the above-mentioned combination by the first image signal generation unit 105 is referred to as "image (A+B)".

Further, based on the image compression information supplied from the system control unit 112, the second image signal generation unit 106 compresses the plurality of pupil-divided pixel signals output from the image pickup unit 103, to generate an image signal for focus detection. Specifically, compression processing is conducted for the image signal of any one of the image A and the image B read from the image pickup unit 103. This embodiment is described on the assumption that the compression processing is conducted for the image A. In other words, in this embodiment, the second image signal generation unit 106 generates the image signal of the image A whose signal amount is compressed. An image B signal corresponding thereto is generated by the phase difference detection signal generation unit 109 from the image signal of the image (A+B) compressed in the same manner as the image A, which is received from the third image signal generation unit 108, and the image signal of the image A, which is received from the second image signal generation unit 106.

As a method of the compression, a method of compressing a predetermined number of a plurality of pixels by adding or averaging the pixels is used. This serves to enhance accuracy of the overall pixels after the compression processing by sampling all the pixels. As processing for compressing the image, the image may also be read by thinning out a part of the pixels.

The first image signal (image (A+B)) generated by the first image signal generation unit 105 and the second image signal (image A subjected to the compression process) generated by the second image signal generation unit 106 are transmitted from the image pickup element 100 to the image signal processing unit 150.

FIG. 4A, FIG. 4B, FIG. 4C, and FIG. 4D are diagrams of a timing chart for illustrating a time period taken for transmitting the image signal from the image pickup element 100 to the image signal processing unit 150. This embodiment is described on the assumption that the image signals of the image A and the image (A+B) are transmitted sequentially in the same transmission line with the same data rate during a horizontal synchronization period. Compared to a transmission conducted without subjecting the image A to the compression processing as illustrated in FIG. 4A, in a transmission conducted by compressing the image A in a horizontal direction as illustrated in FIG. 4B, it is possible to greatly reduce a transmission time for the transmission from the image pickup element 100 to the image signal processing unit 150, which requires much time. The transmission time can be further reduced by conducting the compression also in a vertical direction. The plurality of image signals are thus acquired from the image pickup element 100. Specifically, the image signals are transmitted to the image signal processing unit 150 in the subsequent stage after conducting the compression processing within the image pickup element 100, which can suppress the lowering of the acquisition rate (frame rate) for the image as an entire system. With this configuration, it is also possible to suppress the lowering of a detection period, and to maintain followability as well as a high-speed focus adjustment operation using the phase difference information. However, the image signal of the image A is compressed within the image pickup element 100, which inhibits the image signal processing unit 150 in the subsequent stage from conducting the saturation detection of each pixel. Thus, in this embodiment, the saturation detection unit 104 is provided within the image pickup element 100, to transmit the detection result therefrom to the image signal processing unit 150 after assigning the detection result to the pixel subjected to the compression processing in association therewith.

The image signal processing unit 107 for recording and display subjects the image signal of the image (A+B) obtained from the first image signal generation unit 105 to the image processing such as aperture correction, gamma correction, and white balance, generates an image signal for recording and display, and sends the image signal to the display unit 113 and the recording unit 114.

Based on compression information received from the system control unit 112, the third image signal generation unit 108 compresses the image signal of the image (A+B) obtained from the first image signal generation unit 105 by the same method as that conducted by the second image signal generation unit 106, and generates the third image signal (FIG. 4C). In other words, when the compression is based on the addition or the averaging, the number of pixels and the positions of the pixels to be subjected to addition processing or averaging processing are set to be the same as those of the second image signal generation unit 106. This allows the image A output from the second image signal generation unit 106 and the image (A+B) output from the third image signal generation unit 108 to be associated with the position of the pupil-divided pixel on the image pickup element 100.

The phase difference detection signal generation unit 109 generates the image signal of the image B that pairs with the pupil-divided image A from the image signal of the image (A+B) sent from the third image signal generation unit 108 and the image signal of the image A for focus detection sent from the second image signal generation unit 106. The phase difference detection signal generation unit 109 thus generates the image signals of the image A and the image B serving as the signals for phase difference detection necessary for the focus detection (detection of a focus state) (FIG. 4D). In this embodiment, the first image signal generation unit 105 generates the image signal of the image (A+B) as an added signal of the image A and the image B that make a pair, which allows the image signal of the image B to be generated by subtracting the image A from the image (A+B). The focus detection unit 110 subjects the signals for phase difference detection of the image A and the image B that make a pair to the correlation operation processing, to calculate the phase difference information (focus state) on a subject image formed by the photographing optical system 101.

Figure 3A:
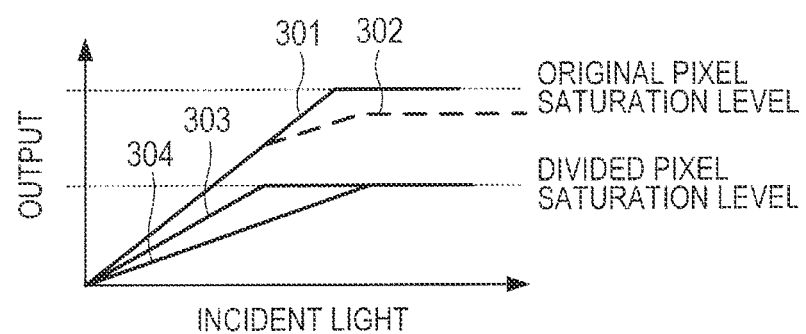
FIG. 3A and FIG. 3B are graphs each for showing an output level characteristic relative to an incident light amount.
Figure 3B:
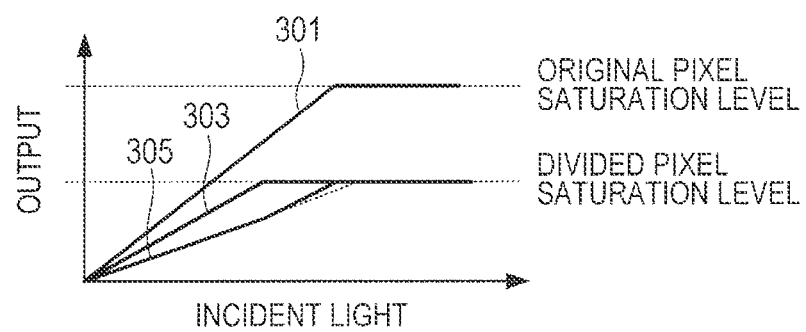

Now, a problem with the saturation and the correlation operation are described with reference to FIG. 3A and FIG. 3B. FIG. 3A and FIG. 3B are graphs for showing a relationship between incident light on the pixel and an output thereof. A horizontal axis thereof indicates an amount of light entering the microlens 201, and a vertical axis thereof indicates the pixel value output from the pixel.

In FIG. 3A and FIG. 3B, a characteristic curve 301 indicates a characteristic of an image output obtained in the case where the pixel is not divided, which maintains linearity thereof until the output is reached to the saturation level. If the light entering the microlens 201 evenly falls on the divided pixels, when the divided pixels are added up, the characteristic indicated by the characteristic curve 301 is exhibited. However, the light does not evenly fall on the divided pixels unless a focus is obtained at a center in an image height. Thus, a time period taken to reach the saturation level is different depending on the divided pixels.

FIG. 2B is an illustration of a state in which the light falls on the pixel in a spot high in the image height, that is, the pixel in a periphery of the image pickup surface. The light obliquely enters the pixel in the periphery of the image pickup surface, and hence the light hardly falls on the pixel 204 and mostly falls on the pixel 205. Therefore, the pixel 205 reaches the saturation earlier. In FIG. 3A and FIG. 3B, a characteristic curve 303 of the pixel 205 and a characteristic curve 304 of the pixel 204 are shown. The characteristic curve 303 reaches the saturation level earlier, and hence the characteristic of the pixel signal obtained by adding up the pixel 205 and the pixel 204 is indicated by a characteristic curve 302, to be influenced by the saturation earlier than that indicated by the characteristic curve 301.

As a countermeasure to avoid the influence, there is a method that employs such a pixel structure as disclosed in Japanese Patent Application Laid-Open No. 2013-084742. By employing a structure in which the charge generated in the pixel 205 leaks into the pixel 204 when the saturation is reached, the characteristic indicated by the characteristic curve 301 is exhibited when the values of the pixel 205 and the pixel 204 are added up. In that case, the characteristic of the pixel 204 is exhibited as shown by a characteristic curve 305 in FIG. 3B. The characteristic curve 305 starts to exhibit a rise in inclination of the output relative to the incident light when the characteristic curve 303 reaches the saturation. In addition, the image A and the image B have a parallax depending on a defocus amount, and therefore have greatly different levels in an unsharp image. Due to the leakage of the saturated charge, the image A and the image B are both saturated in a highlighted part of the image.

Figure 5A:
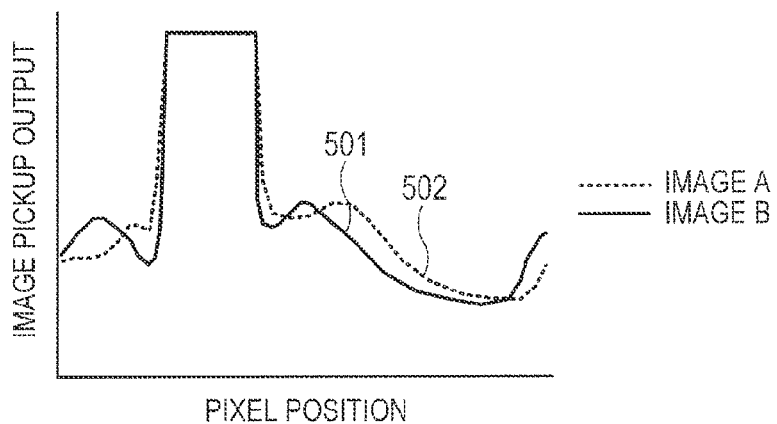
FIG. 5A and FIG. 5B are graphs for showing an image output waveform and a correlation image thereof, respectively.

FIG. 5A is a graph for showing an example in which the image A and the image B that are defocused are partially saturated. The defocus amount can be calculated by multiplying an image deviation amount between the image A and the image B by a constant determined by a base line length. In FIG. 5A, a waveform 501 of an image pickup output for the image B and a waveform 502 of an image pickup output for the image A are shown.

The image A and the image B have image deviation, and hence it is supposed to be possible to obtain the defocus amount, but there is no deviation of the image in the part being saturated. In the case of FIG. 5A, due to a great degree of influence, the highest coinciding degree is exhibited in a position in which the image A and the image B do not have the image deviation. In other words, as a result of the correlation operation, it is determined that the image deviation is not being caused, and hence it is erroneously determined that an in-focus state is effective.

Figure 5B:
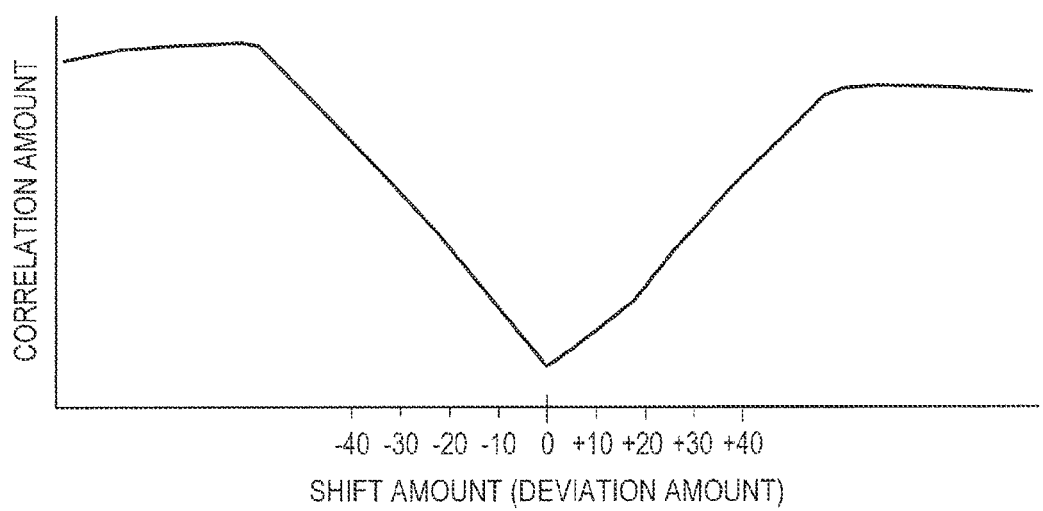

FIG. 5B is a graph for showing a correlation image obtained by conducting the correlation operation for the image A shown by the waveform 502 in FIG. 5A and the image B shown by the waveform 501 therein. The correlation image represents an image for expressing a correlation amount obtained based on a deviation amount by which the image A and the image B are deviated little by little. As the correlation amount, an indicator such as a total sum of the absolute value of a difference called SAD or a total sum of the square of the absolute value of a difference called SSD is generally used.

In FIG. 5B, the position of a tick 0 on the horizontal axis corresponds to the deviation amount of 0, where the correlation amount is the smallest. The correlation amount is the smallest at a place exhibiting a high correlation, and in the example of FIG. 5B, the image in the part of a deviation amount of 0 can be determined to exhibit the highest coinciding degree. In this manner, the charge leakage due to the saturation causes a phenomenon that the defocus amount is drawn to 0 irrespective of an actual defocus amount.

With that in mind, the focus detection unit 110 determines based on the saturation count information whether or not the image to be output includes a large amount of saturation. In this embodiment, when the saturated pixels account for 10% of the entire image, phase difference focus detection processing is not conducted by assuming that the phase difference information to be calculated exhibits low reliability and that there is a high probability that the in-focus state is erroneously determined.

Now, the saturation detection conducted by the saturation detection unit 104 is described. As a detection method therefor, a method of determining and detecting the saturation in accordance with whether or not each pixel value is equal to or larger than a set divided pixel saturation level is employed. In this case, the saturation detection unit 104 conducts the saturation detection for all the pixels corresponding to the plurality of pixel signals that are output from the image pickup unit 103 to be subjected to the compression processing (addition or averaging). This serves to avoid a fear that, if the image (A+B) obtained by the first image signal generation unit 105 or the image A obtained by the second image signal generation unit 106 partially includes saturated pixels, such a saturated pixel may not be determined as the saturated pixel finally due to a deformed waveform exhibited by the pixel value. The correlation between the image A and the image B is spoiled even when the pixel value exhibits a deformed waveform without being saturated, and hence a calculation result of the correlation operation is influenced by the saturation. Therefore, by conducting the saturation detection within the image pickup element 100 in a state before the image signal is processed, the saturated pixel information improves in accuracy, and reliability of the correlation operation can be correctly determined.

Further, in response to a result from the saturation detection unit 104, the second image signal generation unit 106 assigns saturation information to the pixel after reduction processing when there is a sequence of saturated pixels having the same colors among the plurality of pixels to be used for the addition or the averaging. This serves to prevent a defective pixel of a sensor from being erroneously detected as the saturated pixel.

FIG. 6 is a diagram for illustrating a flowchart of an operation conducted after the electric signal (pixel signal) is output from the image pickup unit 103 until the AF control unit 111 conducts AF control. Further, this flowchart is described assuming that the addition is used as a compression method for the image. This operation is realized by the system control unit 112 executing a control program to control each component of the image pickup apparatus.

In Step S601, the pixel signals of the image A and the image B are acquired from the image pickup unit 103. Subsequently, in Step S602, the saturation detection unit 104 conducts the saturation detection for the pixel signal of each of the acquired images on a pixel-by-pixel basis.

In Step S603, the first image signal generation unit 105 adds up the image A and the image B, to thereby generate the signal of the image (A+B), and the second image signal generation unit 106 conducts the addition processing for the image A, to compress the pixel signal of the image A. In Step S604, the second image signal generation unit 106 assigns the saturated pixel information, which is obtained by the saturation detection unit 104 in the saturation detection, to each pixel of the image A after the addition based on a saturation detection result, and the pixel signal of the image (A+B) and the pixel signal of the image A to which the saturated pixel information is assigned after the addition are output from the image pickup element 100. The output pixel signal is accumulated in the line memory for each of the first image signal generation unit 105 and the second image signal generation unit 106, and the correlation operation is conducted on a line-by-line basis.

In Step S605, the third image signal generation unit 108 adds up the image signal of the image (A+B) obtained from the image pickup element 100 so as to correspond to the added-up pixel signal of the image A. In Step S606, the phase difference detection signal generation unit 109 subtracts the image A from the image (A+B) to generate the image signal of the image B, and outputs the respective image signals of the image A and the image B. Further, the phase difference detection signal generation unit 109 may carry out other preferred processing for various correlation operations such as filter processing for extracting a high-frequency component from the respective image signals.

In Step S607, the number of pieces of saturated pixel information is counted on a line-by-line basis by the focus detection unit 110, to generate the saturation count information. In Step S608, when the saturation count information on a target line is equal to or smaller than a threshold value, the procedure advances to Step S609. When the saturation count information is larger than the threshold value, it is highly probable that correct phase difference information cannot be obtained due to the influence of the saturated pixel even in a case where the correlation operation is conducted for the target line, and hence the procedure advances to processing for the next line without executing the correlation operation. In Step S609, the focus detection unit 110 conducts the correlation operation. In Step S610, it is determined whether or not the correlation operation has been conducted for all lines of a focus detection area within the image, which is the currently set target of the focus detection, and when the processing has been conducted for all the lines, the procedure advances to Step S611. When the processing has not been conducted for all the lines, the procedure returns to Step S605, and the procedure advances to processing for the next line. In Step S611, the AF control unit 111 calculates the focus information (defocus amount) from the result of the correlation operation, and drives the optical system drive unit 102 in accordance with the calculated focus information, to thereby control the focus position.

According to the first embodiment of the present invention described above, in addition to the high-speed focus adjustment operation conducted in the focus adjustment using the phase difference detection method, the followability is maintained while suppressing the lowering of the acquisition rate for the image by conducting image compression within the image pickup element 100. In addition, by conducting the saturation detection within the image pickup element 100 and outputting the information indicating the result of the saturation detection in association with the pixel signal, it is possible to detect the saturation with an appropriate accuracy.

Second Embodiment

Next, a second embodiment of the present invention is described with reference to FIG. 7.

Figure 7:
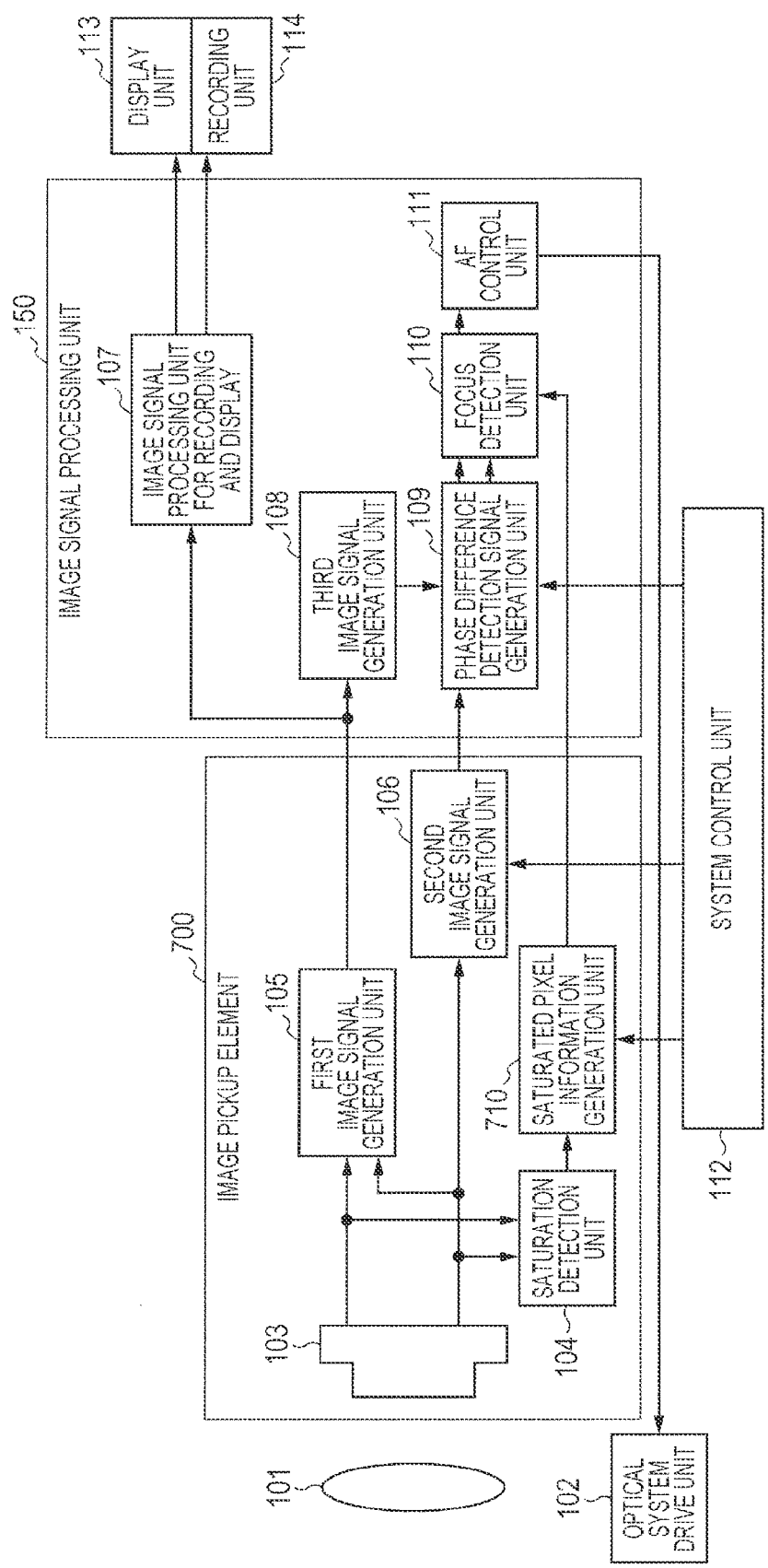
FIG. 7 is a system configuration diagram of an image pickup apparatus to which a focus adjustment apparatus according to a second embodiment of the present invention is applied.

FIG. 7 is diagram for illustrating a system configuration of an image pickup apparatus to which a focus adjustment apparatus according to the second embodiment is applied. In FIG. 7, the same components as those of the configuration of the first embodiment illustrated in FIG. 1 are denoted by the same reference numerals, and descriptions thereof are omitted.

This embodiment is configured so that the saturated pixel information is output to the focus detection unit 110 as independent information without assigning the saturated pixel information to the second image signal. The other configuration is the same as that of the first embodiment, and hence a configuration different from that of the first embodiment is described below. In FIG. 7, a saturated pixel information generation unit 710 generates the saturated pixel information from a result of the saturation detection conducted for each of the pixels of the image A and the image B by the saturation detection unit 104, and outputs the saturated pixel information to the focus detection unit 110.

Now, the saturated pixel information generated by the saturated pixel information generation unit 710 is described. In this embodiment, information on the compression method for the image is acquired from the system control unit 112, and the saturated pixel information corresponding to each pixel after the compression processing is generated in accordance therewith. Further, in contrast to the first embodiment, the saturated pixel information associated with the saturated pixel is output as positional information on the pixel determined to be saturated without providing the information on a pixel-by-pixel basis.

With this configuration, the saturated pixel information assigned to the second image signal is compressed, and only the positional information on the saturated pixel is output, to thereby be able to further improve the acquisition rate for the image.

Third Embodiment

Next, a third embodiment of the present invention is described with reference to FIG. 8 to FIG. 10.

Figure 8:
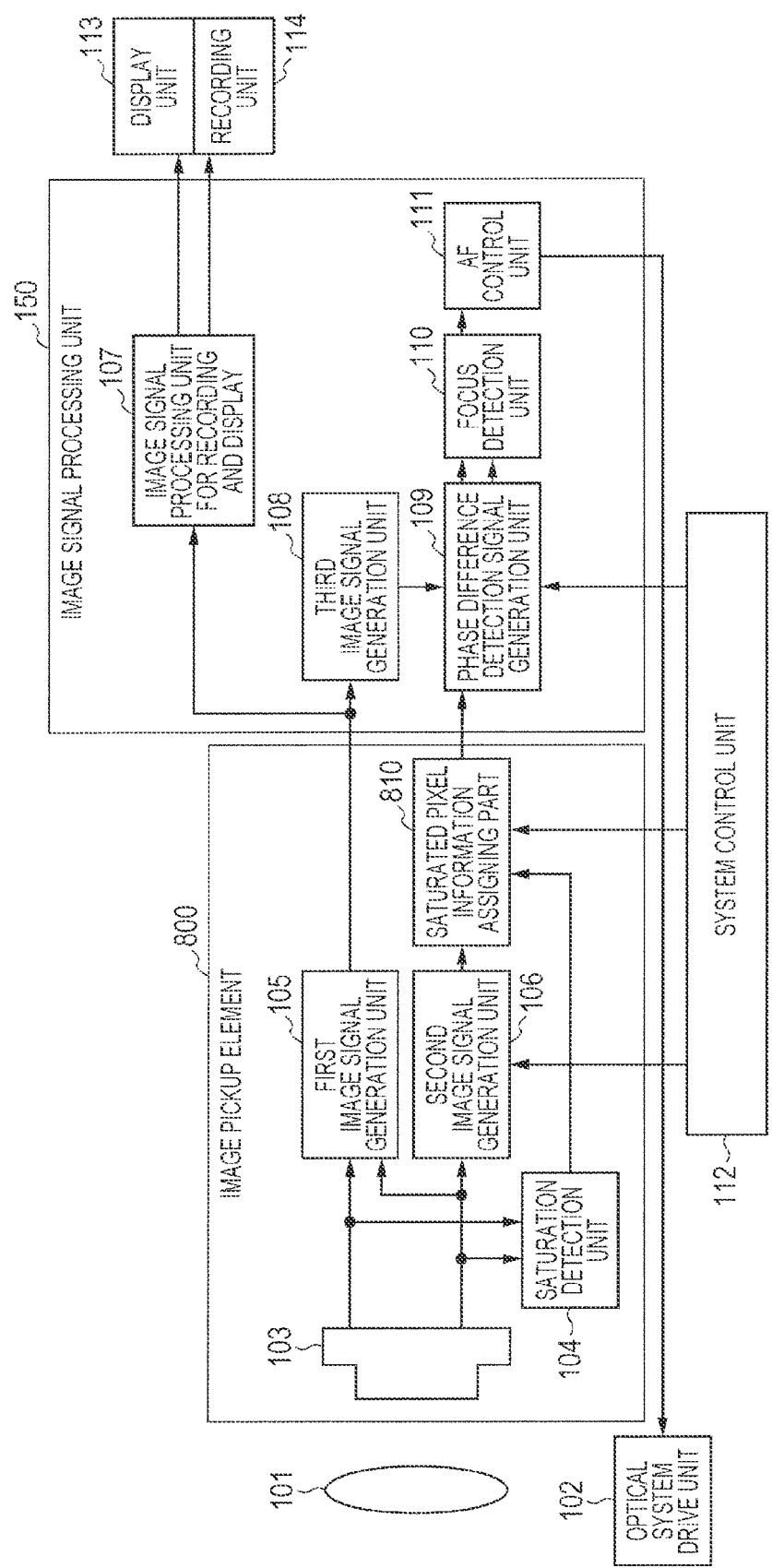
FIG. 8 is a system configuration diagram of an image pickup apparatus to which a focus adjustment apparatus according to a third embodiment of the present invention is applied.

FIG. 8 is diagram for illustrating a system configuration of an image pickup apparatus to which a focus adjustment apparatus according to the third embodiment is applied. In FIG. 8, the same components as those of the configuration of the first embodiment illustrated in FIG. 1 are denoted by the same reference numerals, and descriptions thereof are omitted.

In this embodiment, when the saturated pixel information is assigned to the second image signal, not only the pixel used for the compression (addition or averaging) but also the information on the adjacent pixel is referred to, and more pixels are sampled to generate the saturated pixel information. Therefore, this embodiment is configured so that the corresponding amount of saturation information to be assigned to the pixel after the compression processing can be compressed.

In FIG. 8, a saturated pixel information assigning part 810 generates the saturated pixel information based on the detection result from the saturation detection unit 104 for each of the pixels of the image A and the image B and saturation assignment compression information supplied from the system control unit 112. Then, the generated saturated pixel information is assigned to the second image signal, which is output to the phase difference detection signal generation unit 109.

Now, the saturated pixel information generated by the saturated pixel information assigning part 810 and the configuration for assigning the saturated pixel information to the second image signal are described with reference to FIG. 9 and FIG. 10.

Figure 9:
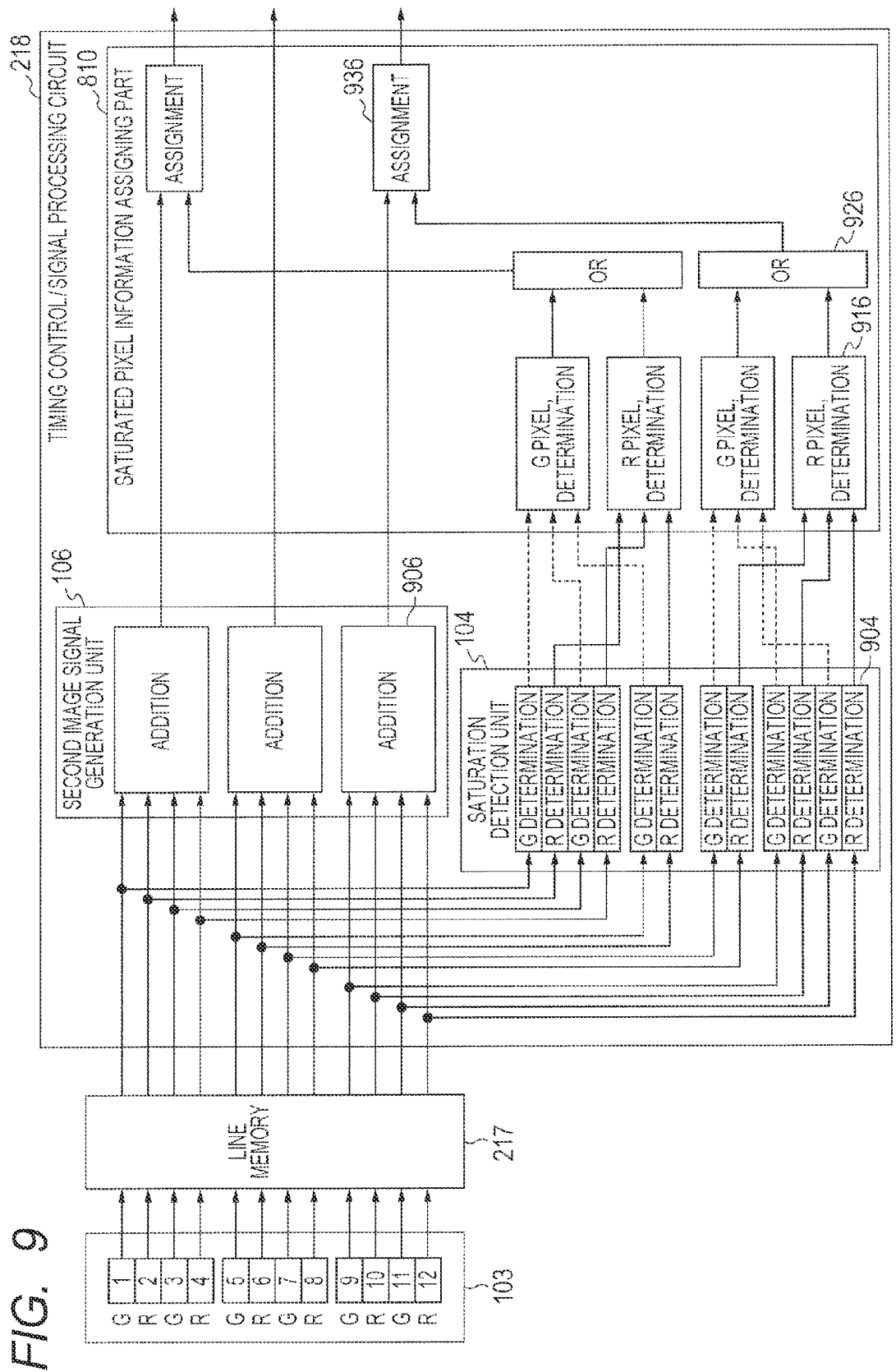
FIG. 9 is a system configuration diagram relating to addition of pixel signals and assignment of saturation information that are conducted in the focus adjustment apparatus according to the third embodiment of the present invention.

FIG. 9 is a diagram for illustrating a flow of data among the image pickup unit 103, the saturation detection unit 104, the second image signal generation unit 106, and the saturated pixel information assigning part 810 according to this embodiment. Note that, it is assumed that the information indicating "4 pixels added" is supplied as the image compression information sent from the system control unit 112 to the second image signal generation unit 106.

Figure 10:
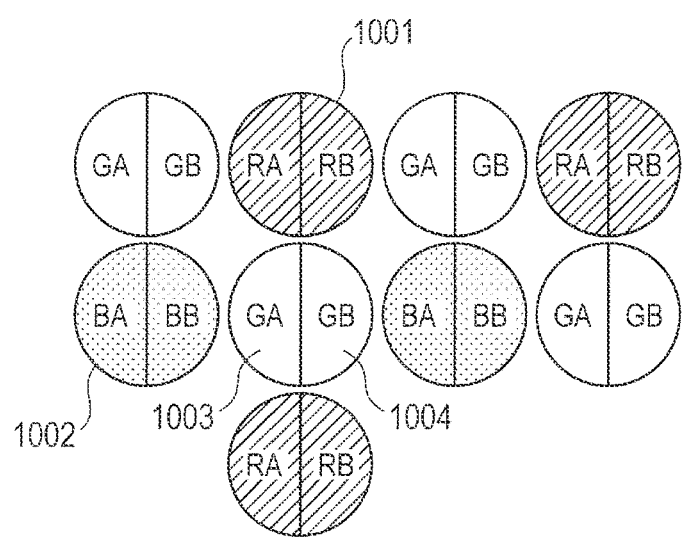
FIG. 10 is a diagram for illustrating a pixel array of an image pickup element included in the image pickup apparatus to which the focus adjustment apparatus according to the third embodiment of the present invention is applied.

FIG. 10 is a diagram for illustrating the pixel array of the image pickup surface of the image pickup unit 103. In FIG. 10, a green image A pixel 1003 and a green image B pixel 1004 are illustrated. In FIG. 10, a red image B pixel 1001 and a blue image A pixel 1002 are illustrated. In this case, when one pixel is formed of the image A pixel and the image B pixel, an array called the Bayer array of RGB is obtained. At this time, only the pixel signal of the image A is input to the second image signal generation unit 106, while the pixel signals of the image A and the image B are input to the saturation detection unit 104. Further, in any case, the pixel signals are successively output in accordance with a list of the pixel array along the horizontal line. In other words, green pixel signals and red pixel signals are first output alternately, and after the end of 1 line, blue pixel signals and green pixel signals are then output alternately.

In the image pickup unit 103 illustrated in FIG. 9, only 12 pixels for the image A are illustrated along the horizontal line in which the green pixels and the red pixels are alternately arranged as in the pixel array illustrated in FIG. 10. First, the pixel signals output from the image pickup unit 103 are added up for every 4 pixels by an addition unit 906 of the second image signal generation unit 106, and are output to the saturated pixel information assigning part 810 as one pixel signal. Meanwhile, in the saturation detection unit 104, a saturation determination unit 904 determines whether or not each pixel value is equal to or larger than the set saturation level, and a determination result of each pixel is output to the saturated pixel information assigning part 810.

Subsequently, the saturated pixel information assigning part 810 assigns the input saturation determination result to the pixel signal after the addition. At this time, it is determined how to summarize the saturation results of each pixel based on the saturation assignment compression information supplied from the system control unit 112. In this embodiment, a same color pixel determination unit 916 determines the saturation when a sequence of 3 pixels having the same color are saturated. In a composite pixel determination unit 926, the pixels having different colors that are adjacent to each other in the horizontal direction are assumed to be the saturated pixels when the same color pixel determination unit 916 has determined that the pixel having any one of the colors is saturated. Then, a saturation information assigning unit 936 assigns an output result from the composite pixel determination unit 926 to the pixel after the addition, which is then output to the subsequent stage portion. At this time, by sampling more saturation detection results than the number of added pixels, the saturation information is not assigned to one pixel among the 3 pixels (outputs from 3 addition units 906) of the addition results as illustrated by the saturated pixel information assigning part 810 in FIG. 9.

This is based on, as described in the first embodiment, the fact that the saturated pixel information is used to determine the ratio of the saturated pixels to all the pixels in the focus detection unit 110. In other words, it suffices that the saturated pixel information is information that allows the ratio of the saturated pixels to an entirety to be grasped correctly, and hence the information is processed so as to prevent this condition from being impaired, to thereby reduce the pixels to which the information is to be assigned. Accordingly, when a large number of saturated pixels are included, by inhibiting the results from being used, it is possible to prevent erroneous determination of the in-focus state, and to reduce and compress a circuit scale by compressing the pixel to which saturation detection information is to be assigned.

In addition, the added pixels with the saturated pixel information compressed can be interpolated in the subsequent stage portion, to thereby assign the saturated pixel information thereto. In a deletion method illustrated in FIG. 9, when any one of the right pixel and the left pixel within the pixel after the addition is determined to be saturated, the pixel is also definitely saturated. In this manner, not only by compressing the saturated pixel information but also by conducting the assignment with a format that allows interpolation, the saturation information on each pixel after the addition can be acquired by the interpolation, which also enables the saturation count information to be generated.

According to the third embodiment of the present invention described above, in addition to the high-speed focus adjustment operation conducted in the focus adjustment using the phase difference detection method, the followability is maintained while suppressing the lowering of the acquisition rate for the image by conducting the image compression within the image pickup element. In addition, by conducting the saturation detection within the image pickup element and outputting the information indicating the result of the saturation detection in association with the pixel signal, it is possible to detect the saturation with an appropriate accuracy. Further, it is possible to compress the saturation information to be assigned to the pixel after the compression processing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-139806, filed Jul. 7, 2014, and Japanese Patent Application No. 2015-113307, filed Jun. 3, 2015, which are hereby incorporated by reference herein in their entirety.

What is claimed is:
1. An image pickup element, comprising:
an image pickup unit including an array of a plurality of unit pixels, each of the plurality of unit pixels including a plurality of pixels;
a signal processing circuit, comprising:
a saturation detection unit configured to detect a saturated pixel based on a plurality of pixel signals of a subject image output from the plurality of pixels of each of the plurality of unit pixels; and
a first image signal generation unit configured to generate a first image signal of the subject image by combining the plurality of pixel signals output from each of ones of the plurality of pixels; and
an output circuit configured to output information indicating a result of detection of the saturated pixel conducted by the saturation detection unit and the first image signal, wherein the output circuit outputs the information indicating the result of the detection of the saturated pixel in association with the first image signal.

2. The image pickup element according to claim 1, wherein
the image pickup unit includes a pupil division unit of a photographing optical system arranged so as to correspond to the array of the plurality of unit pixels, the pupil division unit being configured to form the subject image; and
the pupil division unit is a microlens array including a plurality of microlenses, the plurality of microlenses being arranged so as to respectively correspond to the plurality of unit pixels.

3. The image pickup element according to claim 1, the signal processing circuit further comprising a second image signal generation unit configured to generate a second image signal of the subject image by combining the plurality of pixel signals,
wherein the output circuit further outputs the second image signal.

4. The image pickup element according to claim 1, wherein
the first image signal generation unit acquires image compression information, and combines the plurality of pixel signals output from each of the ones of the plurality of pixels in accordance with the image compression information, to generate the first image signal.

5. The image pickup element according to claim 4, wherein
the saturation detection unit generates the inform cation indicating the result of the detection of the saturated pixel based on the result of the detection of the saturated pixel conducted for a predetermined pixel among the plurality of pixels; and
the output circuit assigns the information indicating the result of the detection of the saturated pixel to each of the predetermined pixel of the first image signal.

6. The image pickup element according to claim 4, wherein
the image compression information is information for specifying a compression method for a signal amount; and
the compression method is at least one of a method of generating an image signal of one pixel by adding up the plurality of pixel signals output from the plurality of pixels or a method of generating the image signal of one pixel from an average of the plurality of pixel signals output from the plurality of pixels.

7. The image pickup element according to claim 1, wherein
the saturation detection unit detects the saturated pixel on a basis of a fact that the pixel signal is higher than a predetermined signal level.

8. A method for controlling an image pickup element including an image pickup unit including an array of a plurality of unit pixels, each of the plurality of unit pixels including a plurality of pixels, the method comprising:
detecting a saturated pixel based on a plurality of pixel signals of a subject image output from the plurality of pixels of each of the plurality of unit pixels;
generating a first image signal of the subject image by combining the plurality of pixel signals output from each of ones of the plurality of pixels; and
outputting information indicating a result of detection of the saturated pixel conducted in the detecting and the first image signal, wherein the information indicating the result of the detection of the saturated pixel is output in association with the first image signal.

9. A non-transitory computer-readable storage medium having stored thereon a program for causing a computer to execute the method of claim 8.

10. An image pickup apparatus, comprising:
a photographing optical system configured to form a subject image,
the image pickup element of claim 1 configured to generate a pixel signal by picking up the subject image formed by the photographing optical system; and
a signal processor configured to conduct focus adjustment for the photographing optical system by using an output from the output circuit.

11. An image pickup apparatus, comprising:
a photographing optical system configured to form a subject image;
the image pickup element of claim 3 configured to generate a pixel signal by picking up the subject image formed by the photographing optical system; and
a signal processor configured to conduct focus adjustment for the photographing optical system by using an output from the output circuit, wherein:
the signal processor includes:
a third image signal generation unit configured to generate a third image signal having a parallax relative to the first image signal from the first image signal and the second image signal; and
a focus adjustment unit configured to detect a focus state of the subject image by using the first image signal and the third image signal, and conduct the focus adjustment for the photographing optical system in accordance with a result of detection of the focus state; and
the focus adjustment unit determines whether or not to conduct the focus adjustment based on the information indicating the result of the detection of the saturated pixel.

12. An image pickup apparatus, comprising:
a photographing optical system configured to form a subject image;
the image pickup element of claim 3 configured to generate a pixel signal by picking up the subject image formed by the photographing optical system; and
a signal processor configured to conduct focus adjustment for the photographing optical system by using an output from the output circuit, wherein:
the first image signal generation unit acquires image compression information, and combines the plurality of pixel signals output from each of the ones of the plurality of pixels in accordance with the image compression information, to generate the first image signal;
the output circuit outputs the information indicating the result of the detection of the saturated pixel in association with the first image signal;
the saturation detection unit generates the information indicating the result of the detection of the saturated pixel based on the result of the detection of the saturated pixel conducted for a predetermined pixel among the plurality of pixels; and
the output circuit assigns the information indicating the result of the detection of the saturated pixel to each of the predetermined pixel of the first image signal,
the signal processor includes:
a third image signal generation unit configured to generate a third image signal having a parallax relative to the first image signal from the first image signal and the second image signal; and a focus adjustment unit configured to detect a focus state of the subject image by using the first image signal and the third image signal, and conduct the focus adjustment for the photographing optical system in accordance with a result of detection of the focus state;

the focus adjustment unit determines whether or not to conduct the focus adjustment based on the information indicating the result of the detection of the saturated pixel; and the focus adjustment unit further uses information indicating the result of the detection of the saturated pixel, which is assigned to the pixel located in a predetermined position with respect to the pixel of the first image signal to which the information indicating the result of the detection of the saturated pixel is not assigned, to interpolate the information on the pixel to which the information indicating the result of the detection of the saturated pixel is not assigned.

13. The image pickup apparatus according to claim 11, wherein the third image signal generation unit subtracts the first image signal from the second image signal, to thereby generate the third image signal.

14. The image pickup apparatus according to claim 12, wherein the third image signal generation unit subtracts the first image signal from the second image signal, to thereby generate the third image signal.

15. The image pickup apparatus according to claim 11, wherein the focus adjustment unit generates information indicating a ratio of the detected saturated pixels to all the pixels based on the information indicating the result of the detection of the saturated pixel, determines whether or not to conduct the focus adjustment based on the information indicating the ratio, and when the ratio is larger than a predetermined threshold value, determines that the focus adjustment is not to be conducted.

16. The image pickup apparatus according to claim 12, wherein the focus adjustment unit generates information indicating a ratio of the detected saturated pixels to all the pixels based on the information indicating the result of the detection of the saturated pixel, determines whether or not to conduct the focus adjustment based on the information indicating the ratio, and when the ratio is larger than a predetermined threshold value, determines that the focus adjustment is not to be conducted.

* * * * *